(12) United States Patent
Lu et al.

(10) Patent No.: US 12,434,221 B2
(45) Date of Patent: Oct. 7, 2025

(54) POROUS CROSSLINKED MATERIAL, PREPARATION AND APPLICATION THEREOF

(71) Applicant: SOOCHOW UNIVERSITY, Suzhou (CN)

(72) Inventors: Jianmei Lu, Suzhou (CN); Qingfeng Xu, Suzhou (CN)

(73) Assignee: SOOCHOW UNIVERSITY, Suzhou (CN)

( * ) Notice: Subject to any disclaimer, the term of this patent is extended or adjusted under 35 U.S.C. 154(b) by 375 days.

(21) Appl. No.: 18/011,425

(22) PCT Filed: Feb. 1, 2021

(86) PCT No.: PCT/CN2021/074735
§ 371 (c)(1),
(2) Date: Dec. 19, 2022

(87) PCT Pub. No.: WO2022/160356
PCT Pub. Date: Aug. 4, 2022

(65) Prior Publication Data
US 2023/0330628 A1    Oct. 19, 2023

(51) Int. Cl.
*B01J 20/26* (2006.01)
*B01D 15/00* (2006.01)
*B01J 20/30* (2006.01)

(52) U.S. Cl.
CPC .......... *B01J 20/267* (2013.01); *B01D 15/00* (2013.01); *B01J 20/305* (2013.01); *B01D 2257/202* (2013.01); *B01D 2257/40* (2013.01); *B01D 2257/70* (2013.01); *B01J 2220/4812* (2013.01)

(58) Field of Classification Search
CPC ............... B01J 20/267; B01J 20/305; B01J 2220/4812; B01D 15/00; C08J 3/09; C08J 3/24; C08L 81/08; C08G 75/24
See application file for complete search history.

(56) References Cited

U.S. PATENT DOCUMENTS 5,041,516 A * 8/1991 Frechet ............... C08G 83/003
424/DIG. 16

FOREIGN PATENT DOCUMENTS

| CN | 104059228 A | 9/2014 |
| CN | 110540647 A | 12/2019 |
| CN | 110804183 A | 2/2020 |
| CN | 110922598 A | 3/2020 |
| CN | 112898571 A | 6/2021 |
| CN | 113150024 A | 7/2021 |

OTHER PUBLICATIONS

Suvendu Karak et al., "Inducing Disorder in Order: Hierarchically Porous Covalent Organic Framework Nanostructures for Rapid Removal of Persistent Organic Pollutants" J. Am. Chem. Soc. 2019, 141, 7572-7581 (Apr. 21, 2019).

Onur Buyukcakir et al., "Thinking Outside the Cage: Controlling the Extrinsic Porosity and Gas Uptake Properties of Shape-Persistent Molecular Cages in Nanoporous Polymers" Chem. Mater. 2015, 27, 4149-4155 (May 13, 2015).

* cited by examiner

*Primary Examiner* — Yong L Chu
(74) *Attorney, Agent, or Firm* — SZDC Law PC

(57) ABSTRACT

A TPC-OTBS n-hexane solution is added to a mixture of TPC-OSO$_2$F, DMF, and DBU and allowed to stand to produce a crosslinked solvent gel; the crosslinked solvent gel is added to methanol, stirred, and dried to produce the porous crosslinked material. The gel acquired can be prepared into a pore-rich solid porous organic polymer material by means of solvent exchange. SEM and TEM are used to characterize the surface and internal morphologies of the solid material, and the porous morphology thereof is discovered, with large pores being the majority. Infrared and nuclear magnetic resonance are used to characterize the structure of a crosslinked polysulfate; the complete reaction of a sulfuryl fluoride group is proven by means of solid-state fluorine nuclear magnetic resonance spectroscopy and XPS element analysis; and the porous structure of the crosslinked polysulfate allows same to be provided with improved application prospect in terms of adsorption.

6 Claims, 8 Drawing Sheets

POROUS CROSSLINKED MATERIAL, PREPARATION AND APPLICATION THEREOF

This application is the National Stage Application of PCT/CN2021/074735, filed on Feb. 1, 2021, which is incorporated by reference for all purposes as if fully set forth herein.

TECHNICAL FIELD

The invention relates to the material preparation technology, and specifically relates to a porous cross-linked material and a preparation method and application thereof.

BACKGROUND TECHNIQUE

Porous organic polymers, as an emerging organic porous material, have the advantages of strong designability, easy preparation, stable and diversified structure, light weight, and excellent adsorption performance compared with inorganic porous materials, and receive wide attention from researchers. Generally, porous organic polymers are mostly cross-linked polymers. A cross-linking method includes forming a skeleton from a polymer body, thereby creating pores. The usual size of these pores is often closely related to the structure of the polymer monomer and the cross-linking agent. There have been some examples showing that some porous organic polymer adsorbents successfully synthesized by cross-linking can effectively treat pollutants in water, such as metal ions, organic pollutants and drug residues, such as antibiotics. Persistent organic pollutants (POPs) in water are a new type of water pollution problem brought about by industrial development. Because persistent organic pollutants generally have strong biological toxicity, many of which are mutagenic and carcinogenic, and are extremely harmful. It is difficult to remove them by common biological methods. Adsorption technology has the advantages of relatively low cost, simple adsorption and regeneration process, simple operation, no harmful by-products, and is considered to be a water purification technology with wide application prospects. The various advantages of porous organic polymers make them extremely advantageous in the removal of persistent organic pollutants from water bodies.

Technical Problem

The chemical synthesis of the invention is convenient, and the preparation of the multifunctional monomer is simple. First, 4,4',4"-trihydroxytriphenylmethane (TPC-OH) is selected as a phenolic precursor. Sulfuryl fluorination and siloxane etherification form trifunctional monomers TPC-OTBS and TPC-$OSO_2F$, respectively. Standing for the first time results a solvogel. The present invention uses multifunctional groups (the number of functional groups is 3 or more) to prepare cross-linked polysulfate for the first time, and the goal is to use a new method to synthesize porous organic polymers and apply them to water pollution remediation.

Technical Solutions

The present invention discloses the following technical solutions: a porous cross-linked material is prepared from a cross-linked solvogel; the cross-linked solvogel is prepared from a monomer for cross-linked solvogel in the presence of DBU. Specifically, the preparation method of the porous cross-linked material disclosed in the present invention is as follows: adding a TPC-OTBS n-hexane solution to a mixed solution of TPC-$OSO_2F$, DMF and DBU, and leaving it to stand to obtain a cross-linked solvent gel; adding the solvogel to alcohol, stirring and drying to obtain a porous cross-linked material.

The invention discloses a cross-linked solvent gel. The preparation method includes the following steps: adding a TPC-OTBS n-hexane solution to a mixed solution of TPC-$OSO_2F$, DMF and DBU, and leaving it to stand to obtain a cross-linked solvent gel.

In the present invention, a ratio of TPC-$OSO_2F$, DMF, DBU, TPC-OTBS n-hexane solution is (200-210 mg):(1-4.5 mL):50 μg:2.15 mL, preferably, (200-210 mg):(3.5-4.2 mL):50 μg:2.15 mL; in the TPC-OTBS n-hexane solution, a ratio of TPC-OTBS and n-hexane is (2.2-2.205 g):22 mL; the alcohol is a small molecular alcohol, such as methanol; the cross-linking solvent condenses The amounts of solvogel and alcohol are not limited as long as the alcohol submerges the solvogel; and stirring and drying are conventional techniques, such as drying at 70-90° C. for 10-15 hours, preferably, at 80° C. for 12 hours.

A typical process for synthesizing the cross-linked solvogel (TPC-cPS-gel) of the present invention includes: weighing TPC-$OSO_2F$ in a sample bottle, measuring DMF with a pipette and add it to the sample bottle as a solvent, and ultrasonically making all solids dissolved, then adding DBU, sonicating again to dissolve and disperse uniformly, and then using a pipette to absorb the pre-prepared n-hexane solution of TPC-OTBS, adding it to the sample bottle along the bottle wall, and forming a clear layered and clear interface, a double-layer liquid; letting the sample bottle stand at room temperature, observing the fluidity of the solution by a tilting method, and observing the formation of gel (conventional technique), pouring off the upper layer of liquid, and removing the lower layer of solvogel, which is TPC-cPS-gel. The specific dissolving, dropping and feeding involved in the present invention are all conventional techniques in the art.

In the present invention, the chemical structural formulas of TPC-OTBS and TPC-$OSO_2F$ are.

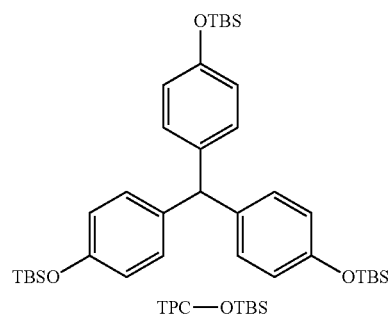

TPC—OTBS

-continued

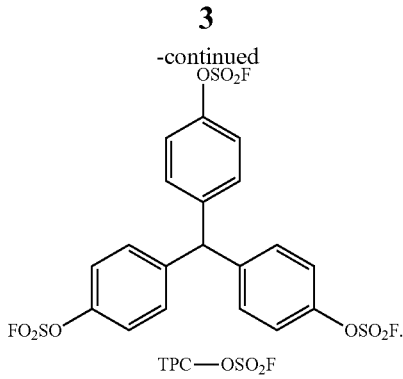

TPC—OSO₂F

In the present invention, in the presence of imidazole, 4,4',4''-trihydroxytriphenyl-methane is reacted with tert-butyldimethylsilyl chloride to prepare TPC-OTBS; further, a molar ratio of 4,4',4''-trihydroxytriphenylmethane, tert-butyldimethylsilyl chloride and imidazole is 1:(3-4):(3-4); and the reaction is carried out at room temperature.

In the present invention, in the presence of triethylamine, 4,4',4''-trihydroxytriphenyl-methane is reacted with sulfuryl fluoride to prepare TPC-OSO₂F; further, a molar ratio of 4,4',4''-trihydroxytriphenylmethane and triethylamine is 1:(3-4); and the reaction is carried out at room temperature.

The invention discloses the application of the above-mentioned porous cross-linked material as an adsorbent; specifically, a method for adsorbing pollutants by using the above-mentioned porous cross-linked material includes the following steps: adding the porous cross-linked material to a solution containing pollutants to realize the pollutants adsorption; the pollutants include iodine, rhodamine B, bisphenol A, tetracycline; the solution can be an aqueous solution or an organic solvent solution.

Beneficial Effects

In the present invention, the multifunctional monomers TPC-OSO₂F and TPC-OTBS are synthesized, and the cross-linked polysulfate gel is chemically synthesized. At a suitable concentration, the cross-linked polysulfate is formed into a solvogel in DMF solution using a two-phase interfacial extraction reaction. The obtained solvogel can be used to prepare solid porous organic polymer materials with abundant macropores by solvent exchange. The surface and internal morphology of the solid material were characterized by SEM and TEM, and the porous morphology is found, and most of them are macropores. XRD, HR-TEM and TEM diffraction proved that the polymer is amorphous, and its pores may be formed by macroscopic gel bundle aggregation and solvent volatilization. The structure of the cross-linked polysulfate is characterized by infrared and nuclear magnetic resonance. The residue of sulfuryl fluoride group is confirmed by solid-state nuclear magnetic fluoride spectroscopy and XPS elemental analysis. At the same time, it is also found that the porous structure of cross-linked polysulfate makes it have a good application prospect in adsorption. There are also good results, and the maximum adsorption capacity can reach 205 mg/g.

EMBODIMENTS OF THE PRESENT INVENTION

Figure 1:
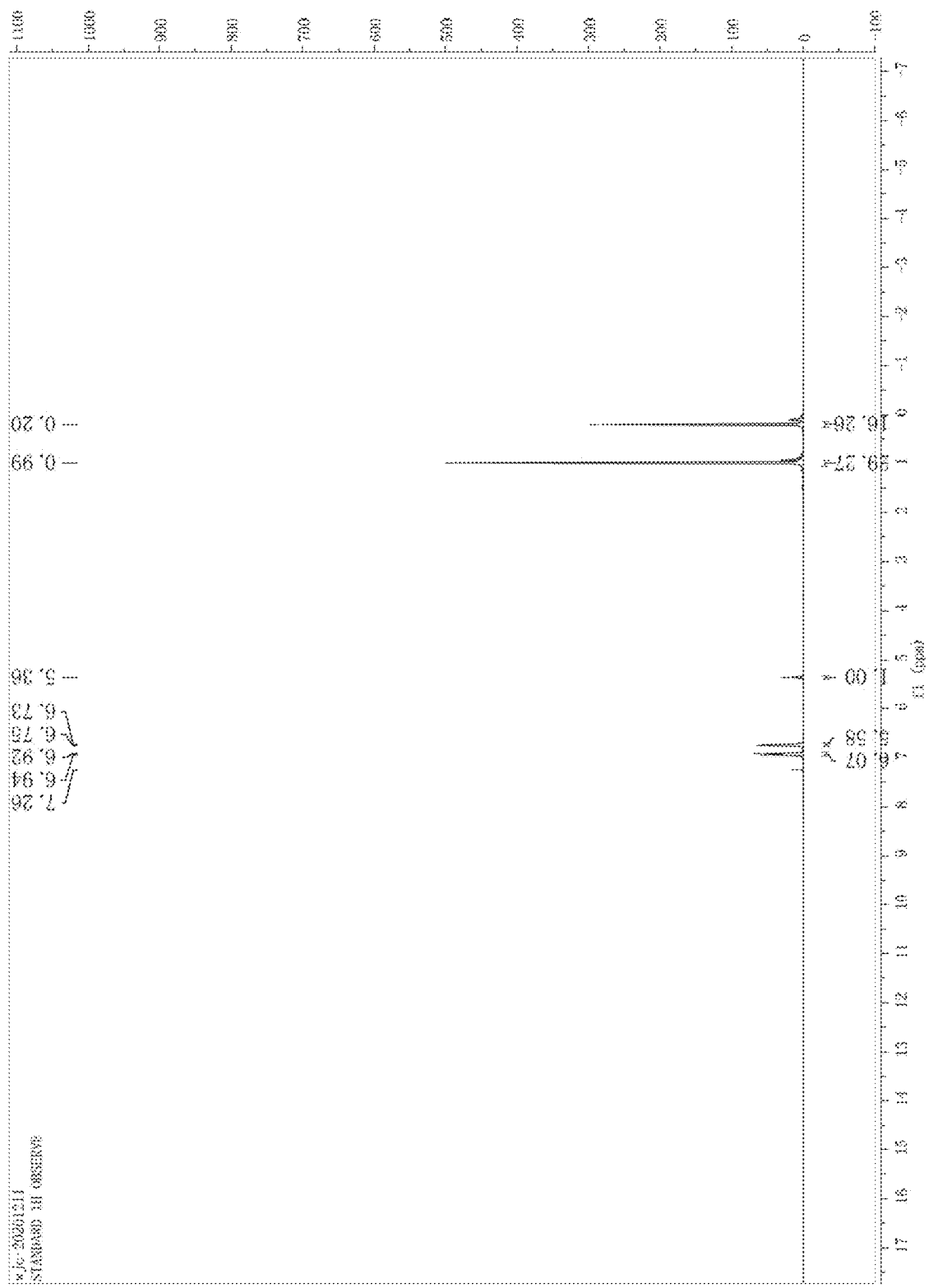
FIG. 1 shows the NMR spectrum of TPC-OTBS.

The prior art is to use bifunctional monomers to synthesize long-chain biaryl polysulfate, and the use of multifunctional groups (the number of functional groups is 3 or more) to prepare the example of cross-linked polysulfate has not been reported. The existing method uses multifunctional monomers as starting materials and cannot obtain polymers with porous structures. It is gratifying that the present invention uses a new method to limit the formation conditions and directions of solvogels to obtain a solvent for cross-linked polysulfate gel. Further, placing the obtained solvogel in methanol for solvent exchange can easily obtain a cross-linked polysulfate solid material with abundant macropores (80-120 nm in pore size), which can be used as an adsorbent to remove bisulfate in water. The porous cross-linked material has good effects to absorb ersistent organic pollutants, such as phenol A, and can be added to the solution containing pollutants to realize the adsorption of pollutants. Compared with the general organic macroporous materials that need to be prepared by a template method, the synthesis method of the present invention does not require a template at all, and macropores can be formed spontaneously during solvent exchange. This work expands the synthesis direction and application scenarios of polysulfate. The starting materials involved in the present invention are all commercially available products, and the specific operation methods and testing methods are conventional methods in the field.

N,N-Dimethylformamide (DMF), tetrahydrofuran (THF), methanol, n-hexane, dichloromethane (DCM) and triethylamine (TEA) were purchased from Sinopharm Holding Group Co., Ltd. 4,4',4''-trihydroxytriphenylmethane was purchased from Shanghai Jiuding Chemical Technology Co., Ltd. Imidazole, tert-butyldimethylsilyl chloride (TB-SCl), and 1,8-diazabicycloundecaheptaene (DBU) were purchased from Tishi Ai (Tokyo) Chemical Industry Development Co., Ltd. Sulfuryl fluoride gas was purchased from Hangzhou Maoyu Electronic Chemical Co., Ltd. All the above materials and reagents were used as received.

The $^1$H-NMR spectrum was measured using an INOVA 400 MHz high-resolution nuclear magnetic resonance spectrometer with tetramethylsilane (TMS) as the internal standard and CDCl$_3$ as the solvent. The $^{13}$C-NMR and $^{19}$F-NMR spectra were obtained by measuring 30-40 mg solid samples at room temperature by AVANCEIII/WB-400 solid wide-cavity superconducting nuclear magnetic resonance spectrometer. The UV-Vis absorption spectrum (Uv-vis) was measured using a UV3600 UV-Vis-NIR spectrophotometer (Shimadzu UV-3600 Plus). The concentrations of all pollutants were measured by the absorption intensity in the UV spectrum. Infrared spectroscopy (FT-IR) was measured on a VERTEX 70 infrared spectrometer with a diamond ATR accessory. Scanning electron microscope (SEM) images were taken with a Hitachi S-4700 scanning electron microscope from Hitachi, Japan. TEM images were taken by FEI TECNAI G20 transmission electron microscope from FEI Company, USA.

Example 1: Synthesis of TPC-OTBS

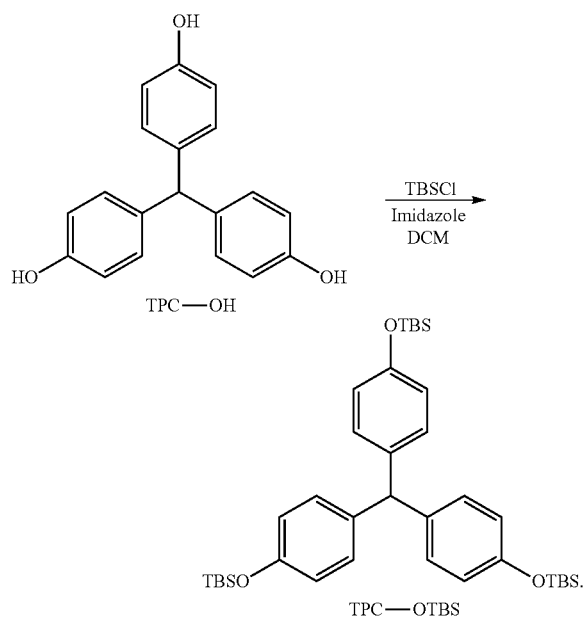

4,4',4"-trihydroxytriphenylmethane (1.46 g, 5 mmol) and imidazole (1.36 g, 20 mmol) were placed in a 100 mL flask, 20 mL of dichloromethane was added, the mixture was stirred at room temperature for 15 minutes, and the solids were completely dissolved. Dissolving tert-butyldimethylsilyl chloride (3.02 g, 20 mmol) in 10 mL of dichloromethane, adding the solution dropwise to the above flask through a constant pressure dropping funnel, keeping stirring in the flask during dropwise addition, and completing the dropwise addition procession after 30 minutes. The reaction mixture was continued to stir at room temperature for 12 hours. The reaction progress was monitored by TLC. After the starting materials were converted, and the solid was removed by filtration. The filtrate was spin-dried and the crude product was purified by column chromatography. The developing solvent was dichloromethane/petroleum ether (v/v=1/2). The pure product was a pure white solid (2.3 g, yield: 72%) TPC-OTBS, TBS from tert-butyldimethylsilyl chloride (TBSCl). The nuclear magnetic spectrum of the synthesized product is shown in FIG. 1. $^1$H NMR (400 MHz, CDCl$_3$, ppm) δ 6.91 (d, J=8.0 Hz, 6H), 6.73 (d, J=8.1 Hz, 6H), 5.33 (d, J=13.5 Hz, 1H), 0.97 (s, 27H), 0.18 (s, 18H).

Synthesis of TPC-OSO$_2$F

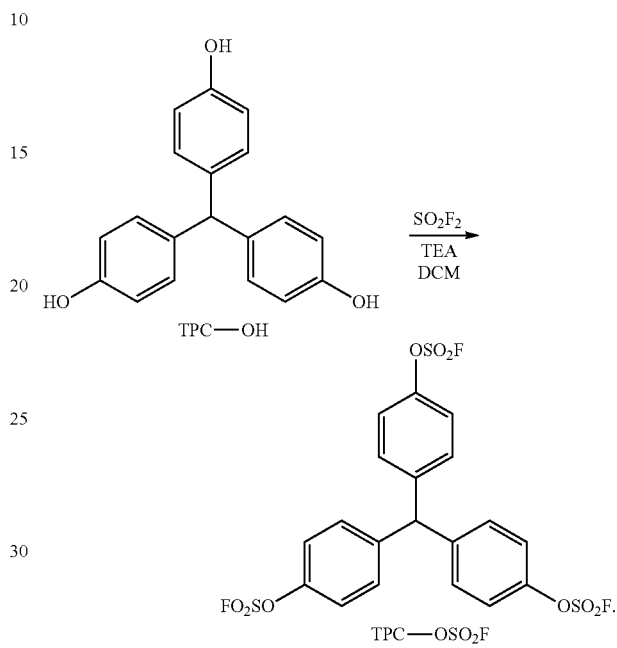

Figure 2:
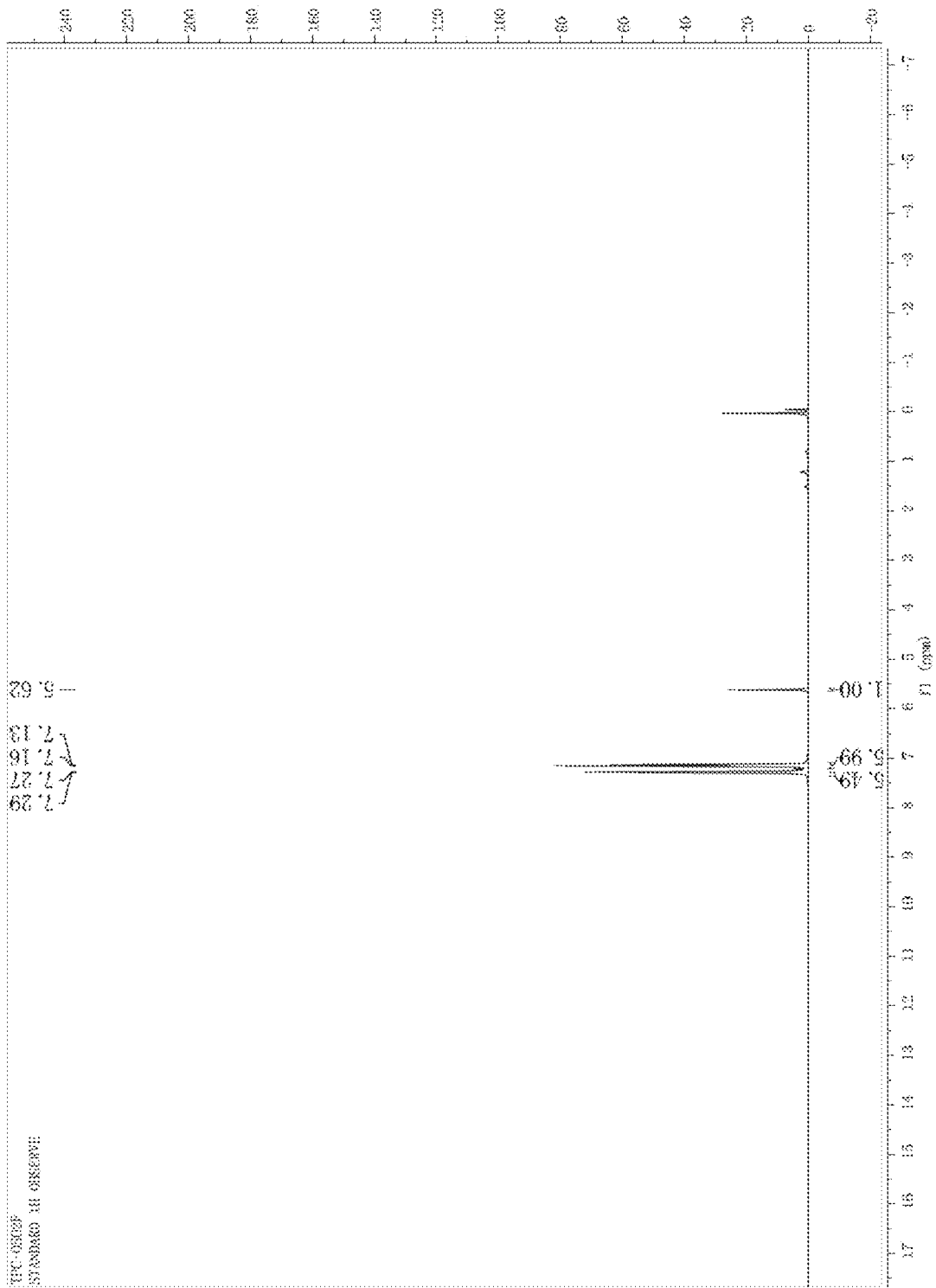
FIG. 2 shows the NMR spectrum of TPC-OSO₂F.

4,4',4"-trihydroxytriphenylmethane (1.46 g, 5 mmol) was placed in a 1000 mL flask, 20 mL of dichloromethane was added, reaction mixture was stirred at room temperature, triethylamine (2.1 g, 20 mmol) was added, and the mixture was stirred continuously to dissolve all the solids. The flask was sealed, pumped to vacuum with a water pump, and then a 55 L air bag was used to introduce sulfuryl fluoride gas. The entire reaction system was kept sealed and the reaction was continued to stir at room temperature for 12 hours. The reaction progress was monitored by TLC. After starting raw materials were converted, the solid was removed by filtration. The filtrate was spin-dried and the crude product was purified by column chromatography. The developing solvent was ethyl acetate/petroleum ether (v/v=1/4). The pure product was white fine crystal (2.5 g, yield: 93%) TPC-OSO$_2$F. The nuclear magnetic spectrum of the synthesized product is shown in FIG. 2. $^1$H NMR (400 MHz, CDCl$_3$, ppm) δ 7.28 (d, J=8.6 Hz, 6H), 7.16 (d, J=8.7 Hz, 6H), 5.31 (s, 1H).

Synthesis of TPC-cPS-gel: The synthesis of TPC-cPS-gel is a typical process, taking the gel synthesis process of TPC-cPS-7 as an example. Weighing 206.5 mg of TPC-OSO$_2$F into a 20 mL flask at room temperature, adding 4 mL of DMF to the flask as solvent with a pipette, dissolving all solids by sonication, and then adding 50 ug of DBU, sonicating again to dissolve and disperse evenly, and then using a pipette to transfer 2.15 mL of the pre-prepared TPC-OTBS n-hexane solution (2.2016 g TPC-OTBS dissolved in 22 mL of n-hexane), and adding it to the sample along the flask wall. A double-layered liquid with obvious layers and clear interface was formed; the flask was left standing, and the fluidity of the solution was observed by a tilting method to determine the formation of gel, and the monomer TPC-OTBS in the upper n-hexane was monitored by TLC. The concentration is used to determine the progress of the reaction. When the reaction is completed, the upper layer of liquid is poured out, and the lower layer of solvogel is removed, which is TPC-cPS-gel, sample 7 in Table 2.

The amount of the above-mentioned TPC-OSO$_2$F was changed, and the rest remained unchanged to obtain different solvogels, as shown in Table 2, sample 1, sample 2, sample 5, sample 6, and sample 8.

Figure 3:
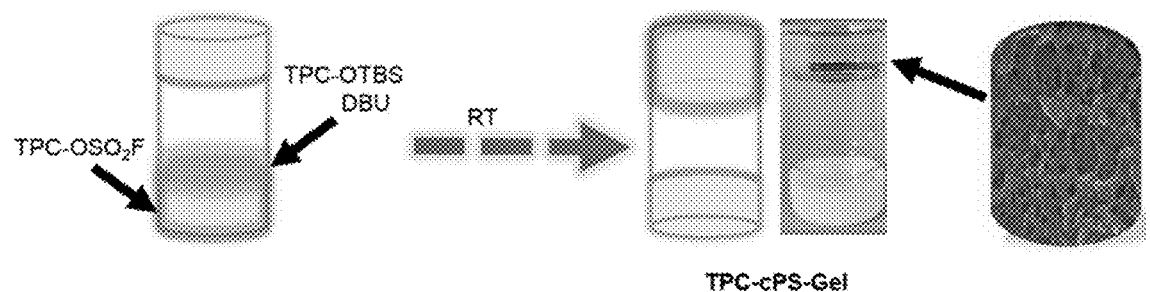
FIG. 3 shows a schematic diagram of the preparation and physical objects of TPC-cPS-gel.

The selection of different reaction solvents is the primary condition for the two-liquid phase interfacial polymerization, and the present invention selects two solvents with very different polarities as the two phases of the interfacial polymerization reaction. TPC-OSO$_2$F and catalyst DBU were dissolved in DMF, and then the n-hexane solution of TPC-OTBS was placed on the upper layer to form a DMF/n-hexane two-phase reaction system, which was allowed to stand for reaction. At a defined monomer concentration, the reaction was observed to occur. As shown in FIG. 3, when the two-phase reaction time was not long (2 hours), both phases maintain fluidity. When the reaction time was extended to 24 hours, it was found by the tilting method that the entire DMF layer lost fluidity and formed condensate. At this time, the concentration of the upper layer solution was analyzed by TLC, and it was found that the reaction of the monomer TPC-OTBS was completed. Observing that TLC hardly develops color indicates that the monomer concentration in the upper layer n-hexane reached a very low level, and the reaction was completed. This conclusion was based on conventional technology in the field; the upper layer solution was removed to obtain a gel, which was still a transparent colloidal solid and has a certain mechanical strength. Since the upper layer solutes penetrated into the lower layer and reacted, the formation of the gel was not only carried out at the interface.

Preparation of TPC-cPS porous cross-linked material: The gel obtained above (TPC-cPS-7) was placed in methanol (submerged), and the solution was stirred for 1 hour to conduct solvent exchange, remove the catalyst DBU, etc. According to $^{13}$C-NMR and $^{19}$F-NMR, all impurities were removed. The final white solid was dried in a vacuum oven at 80° C. for 12 hours to obtain a white solid porous material, TPC-cPS. $^{13}$C NMR (101 MHz, solid, ppm) δ 149.84, 143.23, 130.98, 121.80, 55.02; 19F NMR (377 MHz, solid, ppm) δ −122.98.

Figure 4:
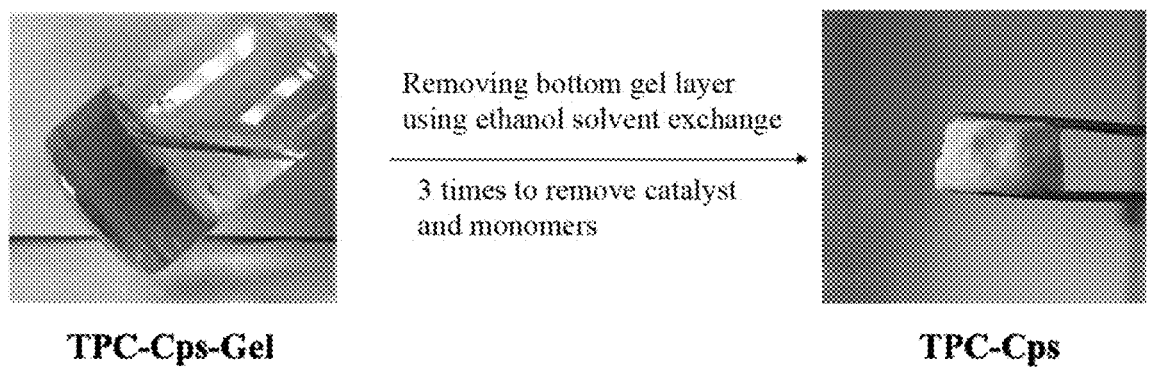
FIG. 4 shows a schematic diagram of the preparation of porous solid TPC-cPS from TPC-cPS-gel by methanol solvent exchange.

Placing the gel in the precipitant methanol resulted in a solvent exchange process as shown in FIG. 4. The gel was no longer clear and a white polymer solid developed. As the solvent exchange proceeded, the DMF in the entire gel was completely replaced by methanol, the catalyst DBU was also taken away by methanol, the gel was solidified, no longer having the elasticity of the gel, and turned into a white solid. The solid was dried, and the surface of the solid was observed by SEM, and it was found that the surface was covered with fine holes. The small fragments of the solid were observed by TEM, and it was found that they had a skeleton structure and voids were formed inside. This polymer was a material with a macroporous structure, and the pore size was mostly around 100 nm.

Taking out the gels of sample 1, sample 2, sample 5, sample 6, and sample 8, putting them in methanol, and using electromagnetic stirring to replace DMF in the gel with methanol to remove DBU and monomers. The obtained cross-linked polymer solids were dried in a vacuum oven at 80° C. for 12 hours to obtain porous cross-linked polysulfates, which were named as TPC-cPS-1, TPC-cPS-2, TPC-cPS-3, TPC-cPS-6, TPC-cPS-8. BET test is shown in Table 1.

TABLE 1

| BET data of TPC-cPS-1 to TPC-cPS-8, corresponding to serial numbers: | | | | | |
|---|---|---|---|---|---|
| Samples | 1 | 2 | 5 | 6 | 7 | 8 |
| BET Surface Area | 1.4067 m$^2$/g | 0.4543 m$^2$/g | 7.8723 m$^2$/g | 27.7836 m$^2$/g | 37.2577 m$^2$/g | 0.0032 m$^2$/g |

Figure 5:
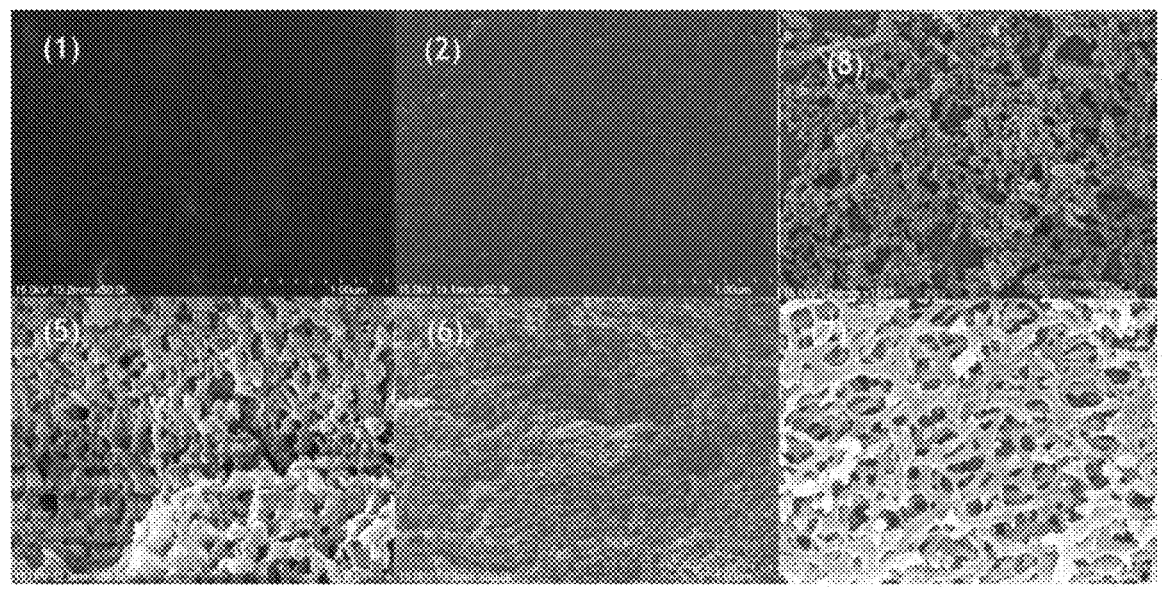
FIG. 5 shows SEM images of TPC-cPS-1 to TPC-cPS-8.

The surface morphology of solid small particles was observed by SEM. As shown in FIG. 5, TPC-cPS-1 and TPC-cPS-2 had dense surface morphologies. At higher concentrations, the entire polymer was a yellowish rigid plastic; TPC-cPS-5 to TPC-cPS-8, small pores formed on the surface of cross-linked polysulfate were observed, and TPC-cPS-6 and TPC-cPS-7 both had good morphologies, the pore size distribution was uniform, and the strength in the gel state was high, and would not be broken by external shear forces, such as electromagnetic stirring; the smallest TPC-cPS-8, there were many macroporous defects, its aggregate state was also powder, and the strength in the gel state was not high, and it was easily affected by external shear forces, such as electromagnetic stir to break up.

Figure 6:
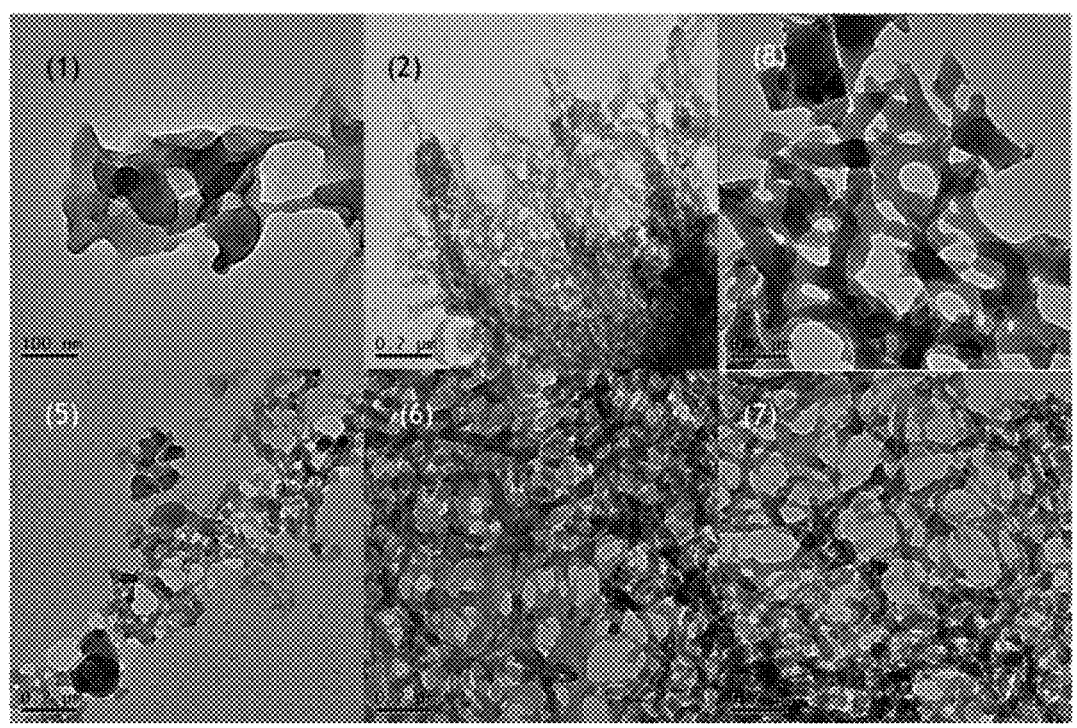
FIG. 6 shows TEM images of TPC-cPS-1 to TPC-cPS-8.

Observation of solid small particles by TEM images gave similar results as SEM images. As shown in FIG. 6, although it was observed that the skeleton was formed by TPC-cPS-1, TPC-cPS-2, and TPC-cPS-5 polymers at the macroscopic level, they were extremely dense. After the concentration gradually decreased, the pore size increased. Large macropores began to appear, and with the further reduction of the concentration, the defects of the skeleton became more and more, and the fracture of the skeleton appeared.

Combining SEM and TEM images, it was found that the concentration had a certain influence on the pore size of the cross-linked polysulfate finally formed. Under the conditions that the concentration can be formed, the lower the concentration, the larger the pore size, and the more uniform the pore size distribution tended to be. Increasing the concentration reduced the pore size and even gradually densified.

Figure 7:
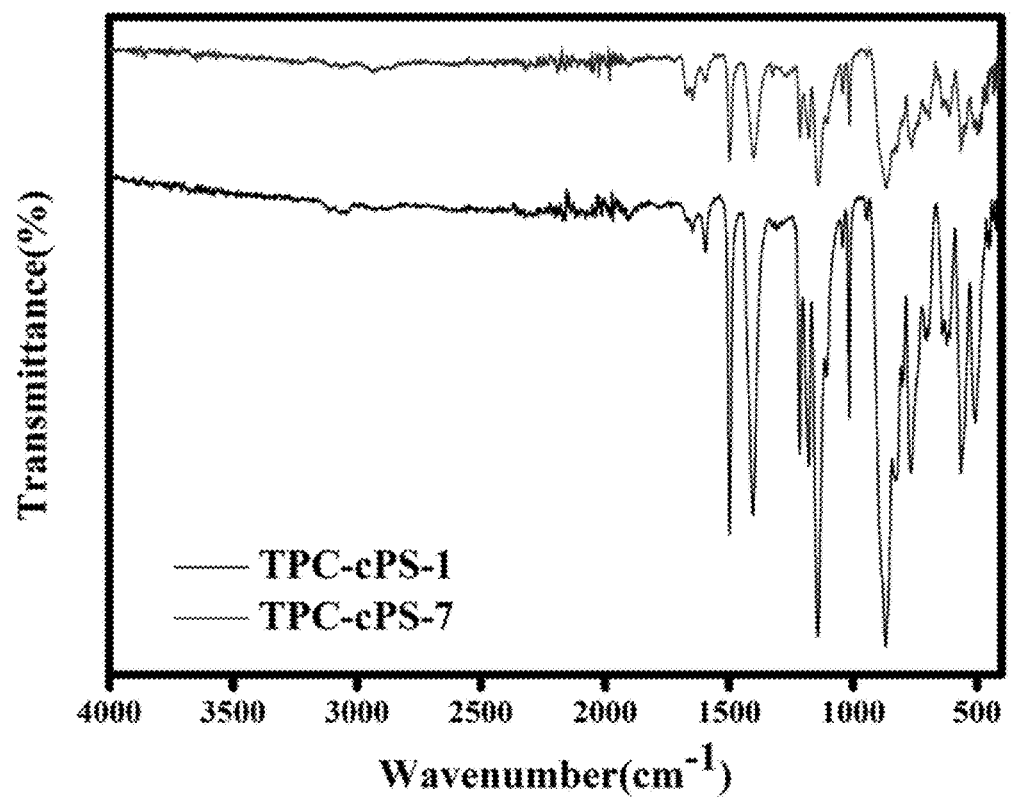
FIG. 7 shows infrared spectra of TPC-cPS-1 and TPC-cPS-7.
Figure 8:
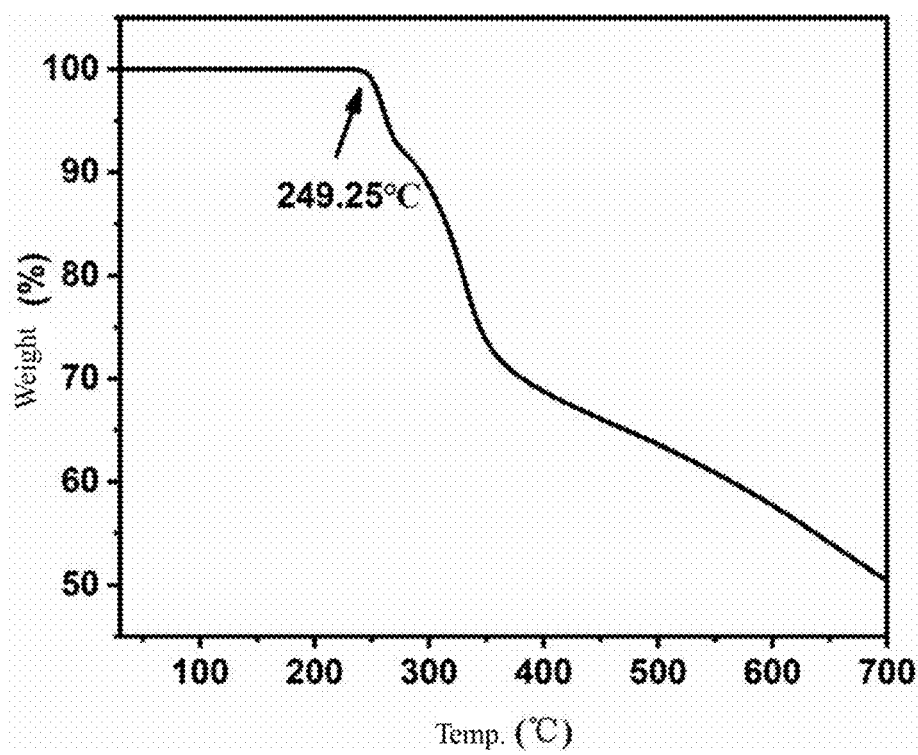
FIG. 8 shows the thermogravimetric diagram of TPC-cPS-7.
Figure 9:
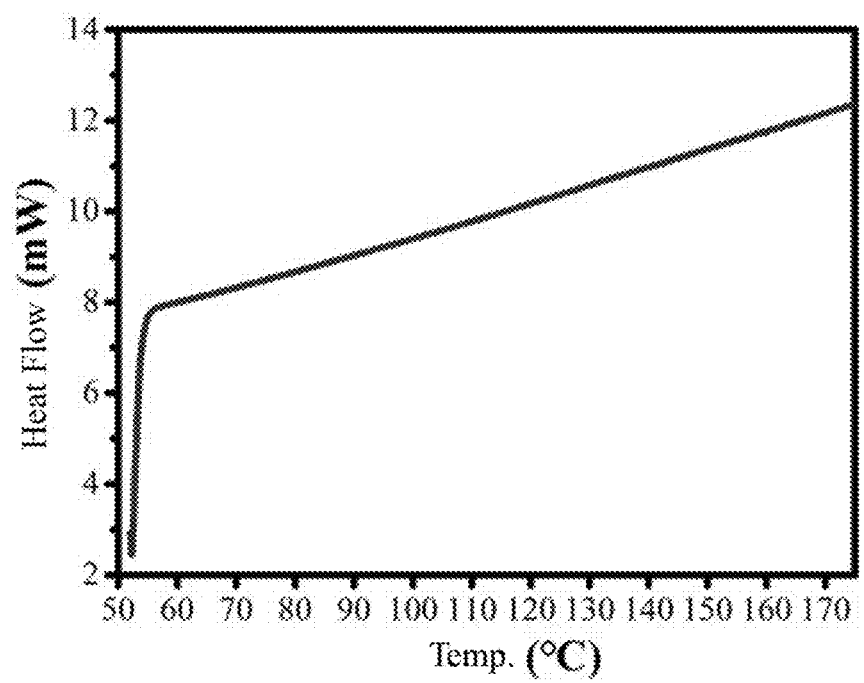
FIG. 9 shows the DSC (Differential Scanning calorimetry) chart of TPC-cPS-7.

In order to investigate the reasons for the formation of pore channels, a series of characterizations were carried out on the as-prepared TPC-cPS. First, TPC-cPS-1 and TPC-cPS-7 were characterized by infrared, and their infrared spectra showed complete agreement (FIG. 7). Based on the identical reaction conditions except for the volume of DMF, it was reasonable to believe that the chemical compositions of all TPC-cPS prepared were identical. The results of TAG (FIG. 8) and DSC (FIG. 9) show that the cross-linked polysulfate had good thermal stability, its 5% weight loss temperature (Td5%) was 249.25° C., and there was no obvious DSC endothermic peak, which was consistent with general characteristics of crosslinked polymers.

Figure 10:
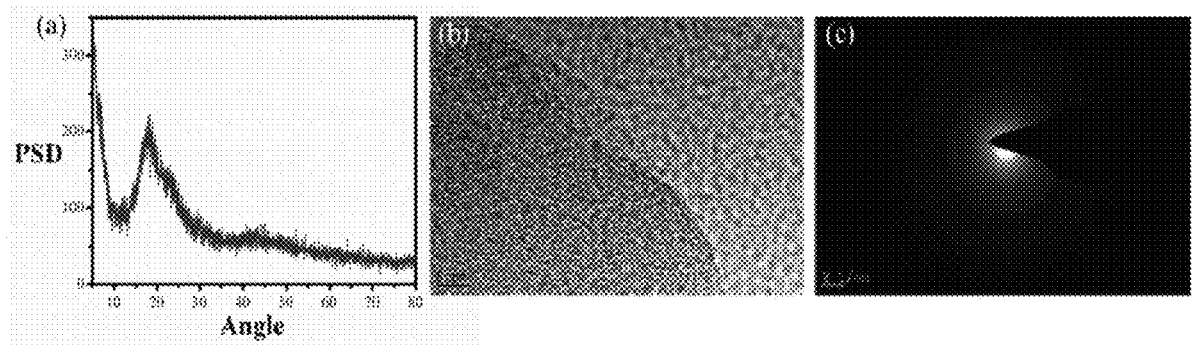
FIG. 10 shows (a) XRD pattern, (b) high-resolution HR-TEM image, and (c) TEM diffraction image of TPC-cPS-7.

At the same time, XRD analysis and TEM diffraction images of TPC-cPS-7 were carried out. As shown in FIG. 10(*a*), there was no obvious sharp peak shape in the XRD pattern of TPC-cPS-7, indicating that there was no regular ordered structure at the molecular level. The high-resolution TEM image (FIG. 10*b*) and TEM diffraction also proved that TPC-cPS-7 had no microscopically ordered structure, which was consistent with the BET data, which further proved that the pores in TPC-cPS were not established by the microscopic chemical structure Rather, they were formed at the macroscopic physical level, the formation of these channels was attributed to the aggregation of the gel fiber bundles and the volatilization of the solvent.

Figure 11:
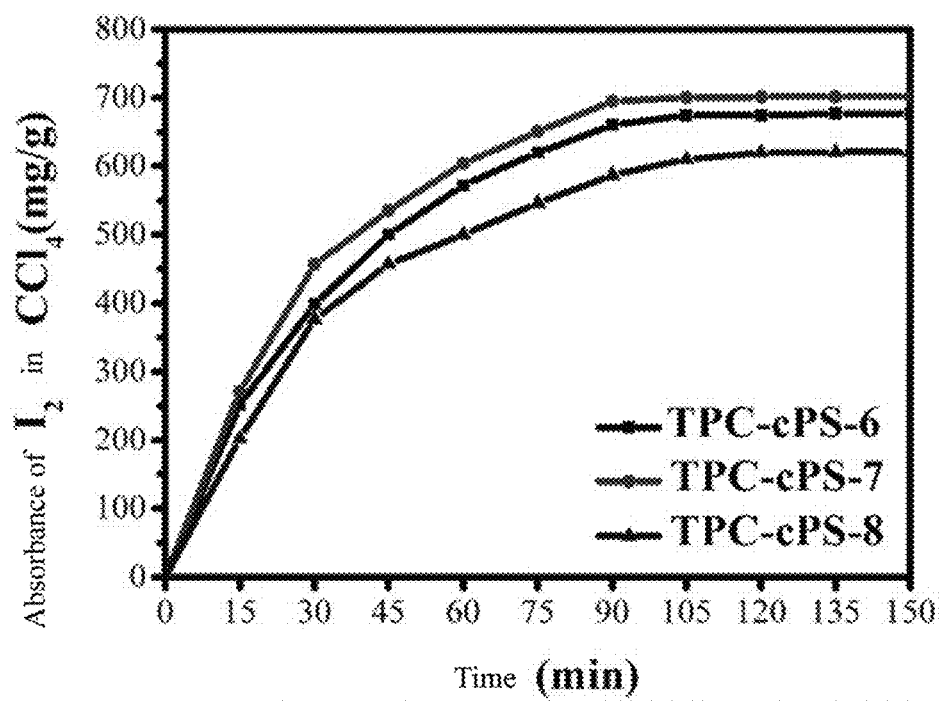
FIG. 11 shows the saturation adsorption curves of TPC-cPS-6, TPC-cPS-7 and TPC-cPS-8 for 2000 ppm iodine in carbon tetrachloride solution.
Figure 12:
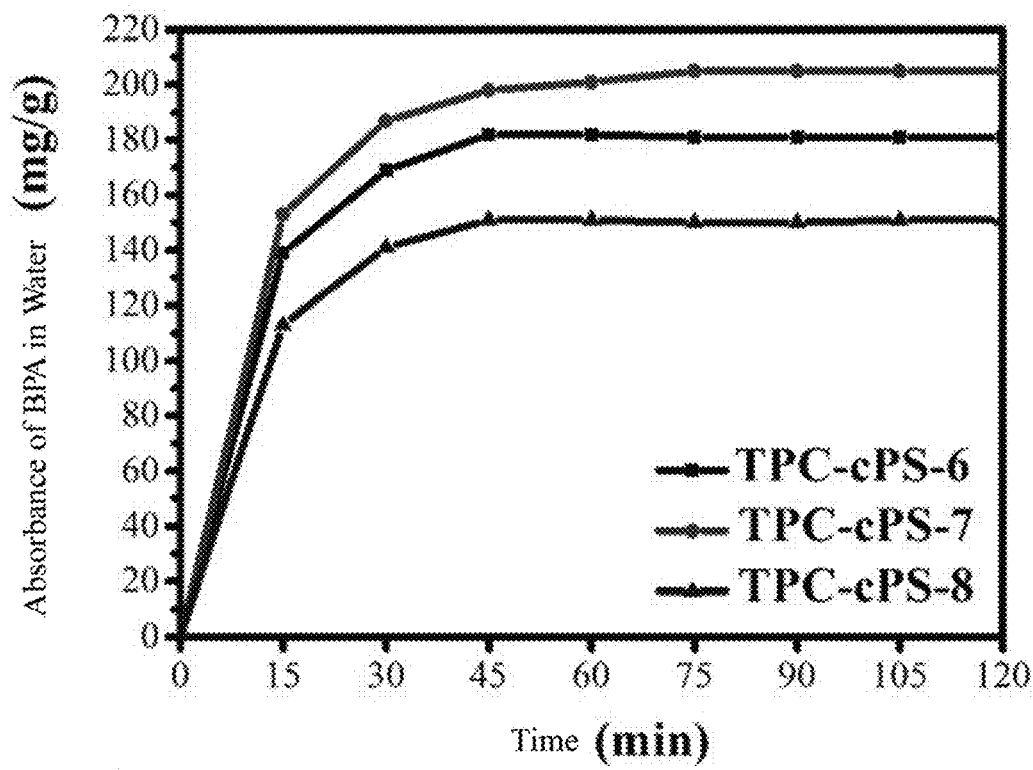
FIG. 12 shows the saturated adsorption curves of TPC-cPS-6, TPC-cPS-7 and TPC-cPS-8 to 50 ppm bisphenol A aqueous solution.
Figure 13:
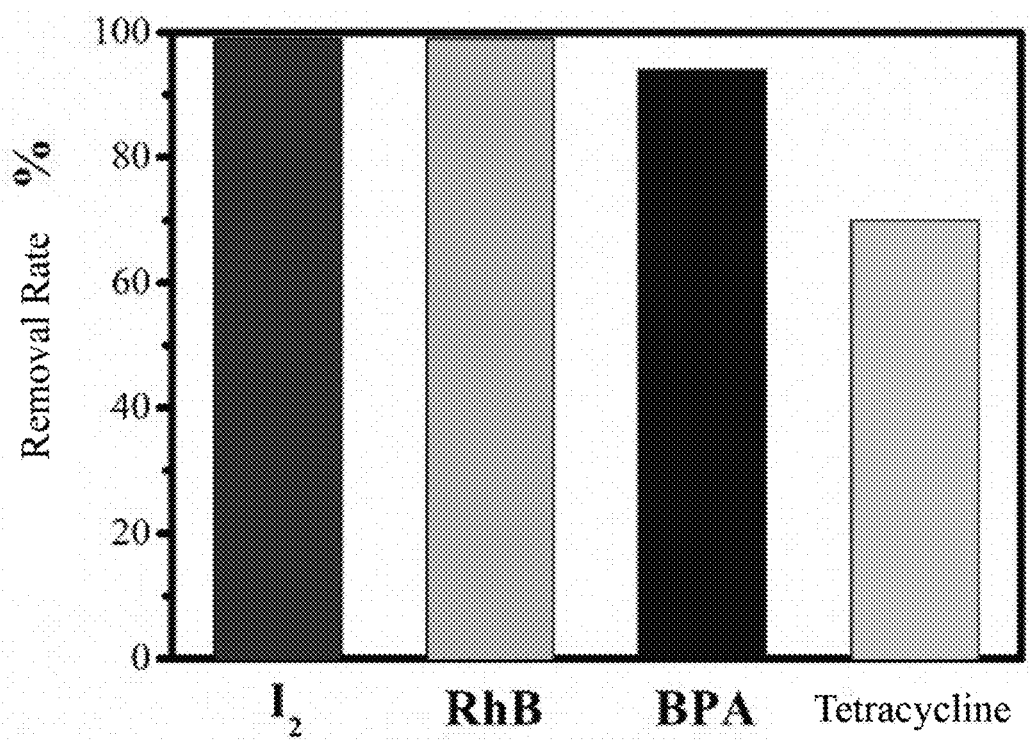
FIG. 13 shows the adsorption and removal rates of TPC-cPS-7 to 10 ppm of iodine in carbon tetrachloride solution and bisphenol A, rhodamine B, and tetracycline in aqueous solutions.

For the first time in the present invention, a porous organic cross-linked polymer framework with excellent morphology was conveniently prepared by using a two-liquid-phase interface extraction reaction method, and the adsorption performance of the porous material was further characterized by SEM and TEM images. It was found that TPC-cPS-7 had excellent porous morphology and pore size distribution. Due to its good wettability to organic solvents, the adsorption performance of TPC-cPS-7 as an adsorbent in organic solutions was investigated. A common adsorbed substance was used to investigate its adsorption performance, and it was found that at a lower concentration, TPC-cPS had a good adsorption effect on iodine. 10 ppm of iodine in carbon tetrachloride solution was used. The concentration of iodine can be reduced to less than 0.1 ppm within half an hour of adsorption, the specific concentration exceeded the UV detection limit, and the removal rate was generally considered to be 100% (FIG. 13). In order to investigate its adsorption capacity, a carbon tetrachloride solution of 2000 ppm iodine was prepared, and the concentration of the adsorbent was still 1 mg/mL (10 mg adsorbent was added to the 10 mL solution), and the concentration of iodine in the solution concentration was measured every 15 minutes, a total of 150 minutes of adsorption, and the amount of adsorption was calculated. At the same time, the same test was carried out on TPC-cPS-6 and TPC-cPS-8 as a control, and the adsorption capacity results were shown in FIG. 11. It can be seen that TPC-cPS-7 had the best adsorption effect among the three adsorbents, and its adsorption rate and adsorption capacity were the best, and the maximum adsorption capacity can reach 702 mg/g; the adsorption effect of TPC-cPS-8 was slightly worse than that of TPC-cPS-6. Under the same test, the adsorption effects of TPC-cPS-1, TPC-cPS-2 and TPC-cPS-5 were much worse than that of TPC-cPS-8. The results of iodine adsorption were similar to the morphological results observed by SEM for each sample.

In the aqueous phase, TPC-cPS was found to have a good removal effect for some dyes and persistent organic pollutants as an adsorbent. The aqueous solutions of rhodamine B, bisphenol A, and tetracycline were respectively prepared. When the concentration of organic matter was 10 ppm, using the adsorbent concentration of 1 mg/mL could achieve 100%, 93% and 70% removal rate of rhodamine B, bisphenol A, and tetracycline, respectively. (FIG. 13). Bisphenol A was selected as the research object of the saturated adsorption capacity of TPC-cPS in aqueous phase. Likewise, TPC-cPS-6 and TPC-cPS-8 were compared with TPC-cPS-7. 50 ppm BPA in water (25 mg BPA in 500 mL deionized water) was used, 1 mg/mL sorbent concentration (10 mg sorbent in 10 mL solution). The solution point concentration was measured every 15 minutes, the total adsorption was 120 minutes, and the adsorption capacity was calculated. The adsorption results were shown in the figure. Similarly, TPC-cPS-7 still had a good effect, the general trend was similar to the adsorption of iodine, but it reached saturation in a shorter time, indicating that the adsorption efficiency of bisphenol A was significantly higher. The three samples began to show a large gap. The maximum adsorption capacity of TPC-cPS-7 reached 205 mg/g, but the worst TPC-cPS-8 was only 151 mg/g, which was significantly different from the result of iodine adsorption.

Figure 14:
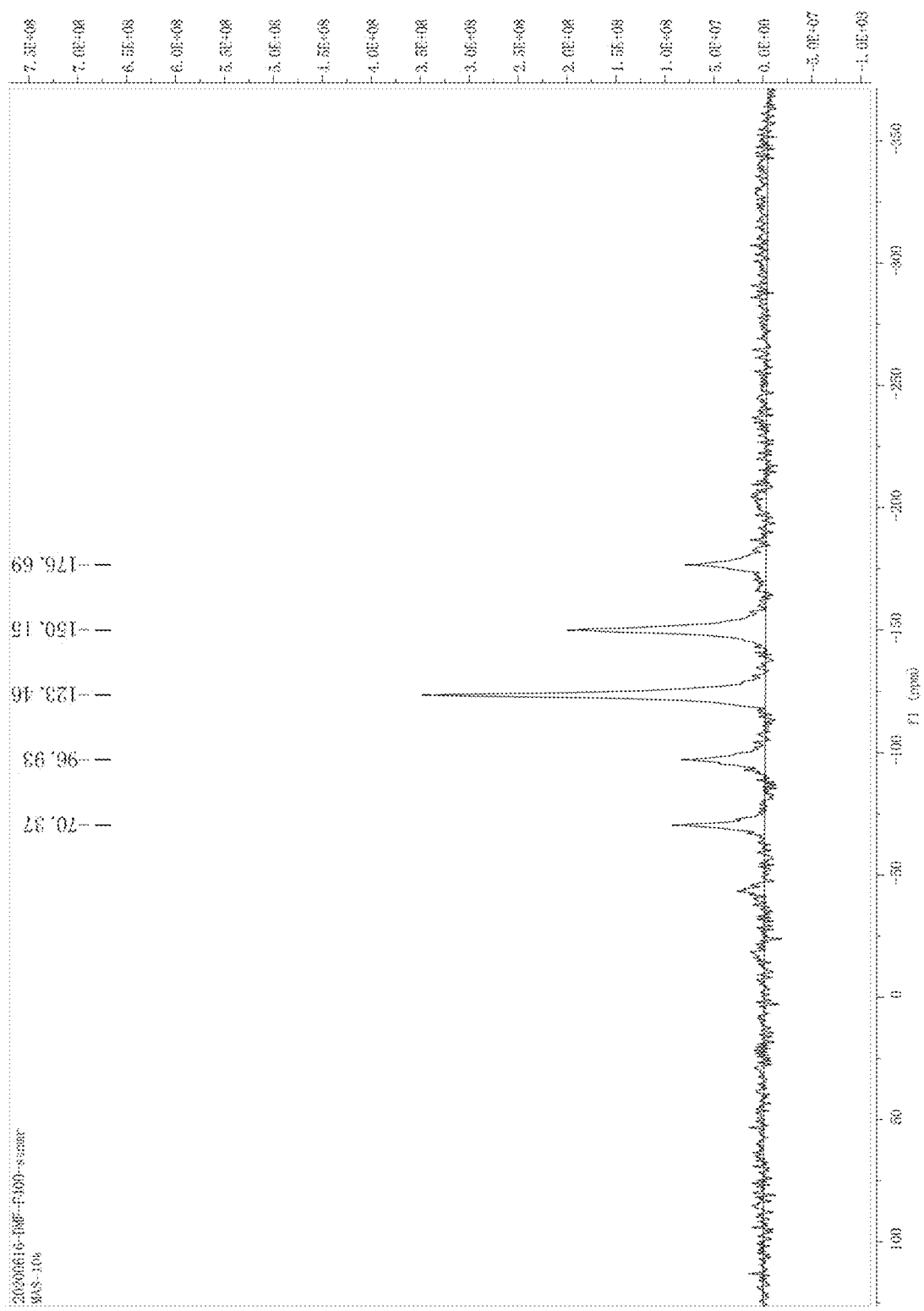
FIG. 14 shows the $^{19}$F-NMR solid nuclear magnetic fluorine spectrum of TPC-cPS-7.

First, in the TPC-cPS infrared test (FIG. 7), there were vibrational absorption peaks of sulfur-fluorine bonds, indicating that sulfur-fluorine bonds still existed in the product. Further, the $^{19}$F-NMR solid nuclear magnetic fluorine spectrum was tested on TPC-cPS-7 (FIG. 14), which proved the existence of fluorine element, and its chemical shift was consistent with the chemical shift of fluorine in the sulfuryl fluoride group in solid nuclear magnetic resonance. XPS elemental analysis also confirmed the existence of the element. It was believed that to a certain extent, the sulfuryl fluoride group had been retained in the cross-linked polymer, which may be the provider of the driving force for adsorption.

Comparative Example 1: During the synthesis of TPC-cPS-gel, the amounts of TPC-OSO2F and DMF in Example 1 were changed, and the rest remained unchanged, and no solvogel was obtained. See Table 2, samples 9 and 10.

TABLE 2

Example 1, Comparative Example 1, the amounts of monomer and solvent:

| Samples | 1 | 2 | 5 | 6 | 7 | 8 | 9 | 10 |
|---|---|---|---|---|---|---|---|---|
| TPC-OSO$_2$F (mg) | 199.7 | 203.1 | 206.7 | 200.3 | 206.5 | 201.2 | 204.01 | 201.2 |
| DMF | 1 mL Forming gel | 2 mL Forming gel | 3.2 mL Forming gel | 3.6 mL Forming gel | 4 mL Forming gel | 4.4 mL Gel strength weak | 4.8 mL Not forming gel | 6 mL Not forming gel |

As shown in Table 2, eight concentration gradients were taken, TPC-OSO$_2$F and 50 ug DBU were dissolved in DMF solvent in eight different volumes, and the n-hexane solution of equal volume and equal concentration of TPC-OTBS was added to the upper layer to conduct the same reactions. The reaction results show that when the concentration was low (sample 8), it was difficult to maintain a good gel shape and strength, and the gel can be broken by applying a weak shear force (stirring with a conventional electromagnetic stirrer at 300 rpm), and the strength was not strong. However, the comparative sample 9 and the sample 10 did not form a gel; the remaining gels had good strength and could not be stirred and broken by an electromagnetic stirrer.

The invention claimed is:

1. A method for preparing a porous cross-linked material, comprising:
   adding a TPC-OTBS n-hexane solution to a mixed solution of TPC-OSO$_2$F, dimethylformamide (DMF) and 1,8-diazabicyclo(5.4.0)undec-7-ene (DBU);
   leaving the mixed solution to react at room temperature to obtain a cross-linked solvogel;
   adding the cross-linked solvogel into an alcohol, and stirring and drying to obtain the porous cross-linked material,
   the chemical structural formulas of TPC-OTBS and TPC-OSO$_2$F are:

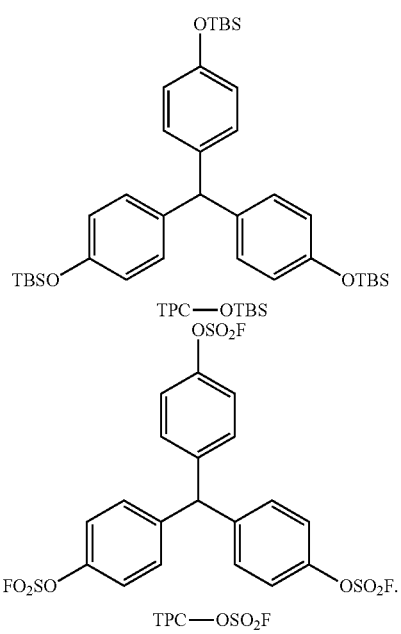

2. The method according to claim 1, wherein the alcohol is methanol.

3. The method according to claim 1, wherein a ratio of TPC-OSO$_2$F, DMF, DBU, and the TPC-OTBS n-hexane solution is (200-210 mg):(1-4.5 mL):50 μg:2.15 mL; and in the TPC-OTBS n-hexane solution, a ratio of TPC-OTBS and n-hexane is (2.2-2.205 g):22 mL.

4. The method according to claim 1, wherein the drying is at 70-90° C. for 10-15 hours.

5. The method according to claim 1, further comprising:
   adding the porous cross-linked material to a solution containing pollutants to realize the adsorption of pollutants.

6. The method according to claim 5, wherein the pollutants comprise iodine, rhodamine B, bisphenol A, and tetracycline.

* * * * *